US008531652B2

(12) United States Patent
Haas et al.

(10) Patent No.: US 8,531,652 B2
(45) Date of Patent: Sep. 10, 2013

(54) THREE WAY DESKTOP UV COUNTERFEIT DETECTOR

(75) Inventors: Dwight Haas, Highland Village, TX (US); Mark Dobbs, New York, NY (US); Jeffrey Kelsoe, Palm Desert, CA (US)

(73) Assignee: Dri-Mark Products, Port Washington, NY (US)

( * ) Notice: Subject to any disclaimer, the term of this patent is extended or adjusted under 35 U.S.C. 154(b) by 165 days.

(21) Appl. No.: 13/082,625

(22) Filed: Apr. 8, 2011

(65) Prior Publication Data

US 2012/0257189 A1 Oct. 11, 2012

(51) Int. Cl.
*G06K 9/00* (2006.01)
*G06K 9/74* (2006.01)

(52) U.S. Cl.
USPC ................................ 356/71; 356/51; 382/135

(58) Field of Classification Search
USPC ............. 356/71, 51; 382/135, 140; 235/375, 235/378, 454
See application file for complete search history.

(56) References Cited

U.S. PATENT DOCUMENTS

| | | | | |
|---|---|---|---|---|
| 5,942,759 | A * | 8/1999 | Romano | 250/461.1 |
| 6,590,641 | B2 * | 7/2003 | Yu | 356/71 |
| 6,603,871 | B2 * | 8/2003 | Liang | 382/135 |
| 6,714,288 | B2 * | 3/2004 | Cohen | 356/71 |
| 6,795,173 | B2 * | 9/2004 | Romano et al. | 356/71 |
| 7,237,711 | B2 * | 7/2007 | Manthei | 235/375 |
| 7,533,905 | B2 * | 5/2009 | Jackson et al. | 283/117 |
| 7,715,613 | B2 * | 5/2010 | Dobbs et al. | 382/135 |
| 2002/0079369 | A1 * | 6/2002 | Shiau | 235/438 |
| 2002/0163633 | A1 * | 11/2002 | Cohen | 356/71 |

* cited by examiner

*Primary Examiner* — Sang Nguyen
(74) *Attorney, Agent, or Firm* — Ostrolenk Faber LLP

(57) ABSTRACT

A counterfeit detection apparatus is formed as a desktop currency detector which has a slim configuration and a small footprint on the order of about 175 mm×100 mm. The desktop counterfeit detector provides white light that can shine from below a currency bill that is placed on its translucent cover and also provides and overhead UV lamp which is situated approximately 30 mm above the translucent light table. The detector also provides a compartment for a counterfeit detector pen which contains a special ink formulation that can apply a color changing test mark to a currency bill to test its reaction with the paper to determine its genuineness. Thus, the detector provides a three-test opportunity to check the genuineness of a currency bill by white light, UV light and a specially formulated ink suitable for checking the paper stock.

19 Claims, 9 Drawing Sheets

THREE WAY DESKTOP UV COUNTERFEIT DETECTOR

BACKGROUND OF THE INVENTION

The present invention relates generally to currency detectors for detecting counterfeit banknotes and paper currency and is directed, more particularly, to a desktop, UV based counterfeit currency detector that detects counterfeits by selectively exposing the banknotes to ultraviolet and white light for detecting various anti-counterfeit features in the banknotes and/or paper currency, using solely battery powered LED's as light sources.

Ultraviolet (UV) counterfeit currency detection devices are known in the prior art. The production by criminals of counterfeit currency, banknotes, bonds, stocks and the like are continually increasing throughout the world as a result of continuing improvements in printing technology, particularly in color printing equipments and the increased ability to obtain the special currency paper used for banknotes, etc. Counterfeit currency/banknotes are now being made which cannot be detected by the unaided eye, and which are virtually indistinguishable from genuine banknotes and currency. Single test counterfeit detection devices currently exist, but are generally not fully reliable.

There remains a need for a desk top/tabletop ultraviolet (UV) counterfeit detector that uses ambient backlight (diffused white light) from an LED to distinguish counterfeit watermarks from genuine watermarks on genuine currency, and which also utilizes ultraviolet (UV) light/radiation from an LED that are more readily detectable by UV light to distinguish certain features on counterfeit currency paper from genuine currency paper. The UV detector should also include a translucent surface for diffusing visible white light and an arrangement for projecting UV light in a manner which assures that it will not strike or be directed toward the eyes of the user, while maintaining the overall detector construction small, portable, battery-operated, and lightweight.

The present invention improves upon the construction of the instant inventors' prior UV counterfeit currency detector, which is described in their recently issued U.S. Pat. No. 7,715,613, the contents of which are fully incorporated herein by reference.

As described in that patent, the prior art is acquainted with various counterfeit currency detectors having various designs, configurations, structures and materials of construction, including as described in U.S. Pat. Nos. 598,960; 6,603,871; 6,858,856; and in U.S. Patent Publication No. 2006/0010071, the contents of which patents and patent publications are incorporated by reference herein.

The instant inventors' prior currency detector described in the aforementioned U.S. Pat. No. 7,715,613 uses a hidden viewing mirror for detection of counterfeit currency and requires the user to carefully focus on a faint image reflected in a minor to discern and differentiate ultraviolet strips or watermarks in the paper currency.

SUMMARY OF THE INVENTION

Accordingly, it is an object of the present invention to provide a desktop counterfeit currency detector that overcomes the above-mentioned drawbacks of the prior art.

It is another object of the invention to provide a desktop counterfeit currency detector, which has a very small desktop footprint, on the order of the size of a U.S. currency bill, and which is battery powered and enables executing multiple tests to detect counterfeit bills.

It is yet another object of the invention to provide a triple-test desktop counterfeit currency detector that allows detecting features of genuine currency using white light, UV light, and and/or an ink formulation that tests the genuineness of the paper on which the currency is printed.

The foregoing and other objects of the invention are realized with a desktop currency detector, which provides a slim and small footprint, on the order of about 175 by 100 millimeters. The slim desktop counterfeit detector provides white light that can shine from below a currency bill that is placed on its translucent window and also provides an overhead UV lamp which is situated approximately 30 millimeters above the translucent light table. Lastly, the detector also provides a compartment for a counterfeit detector pen which contains a special ink formulation that can apply a color changing test mark to a currency bill to test its reaction with the paper to determine genuineness.

Other features and advantages of the present invention will become apparent from the following description of the invention which refers to the accompanying drawings.

DETAILED DESCRIPTION OF THE DRAWINGS

Figure 1:
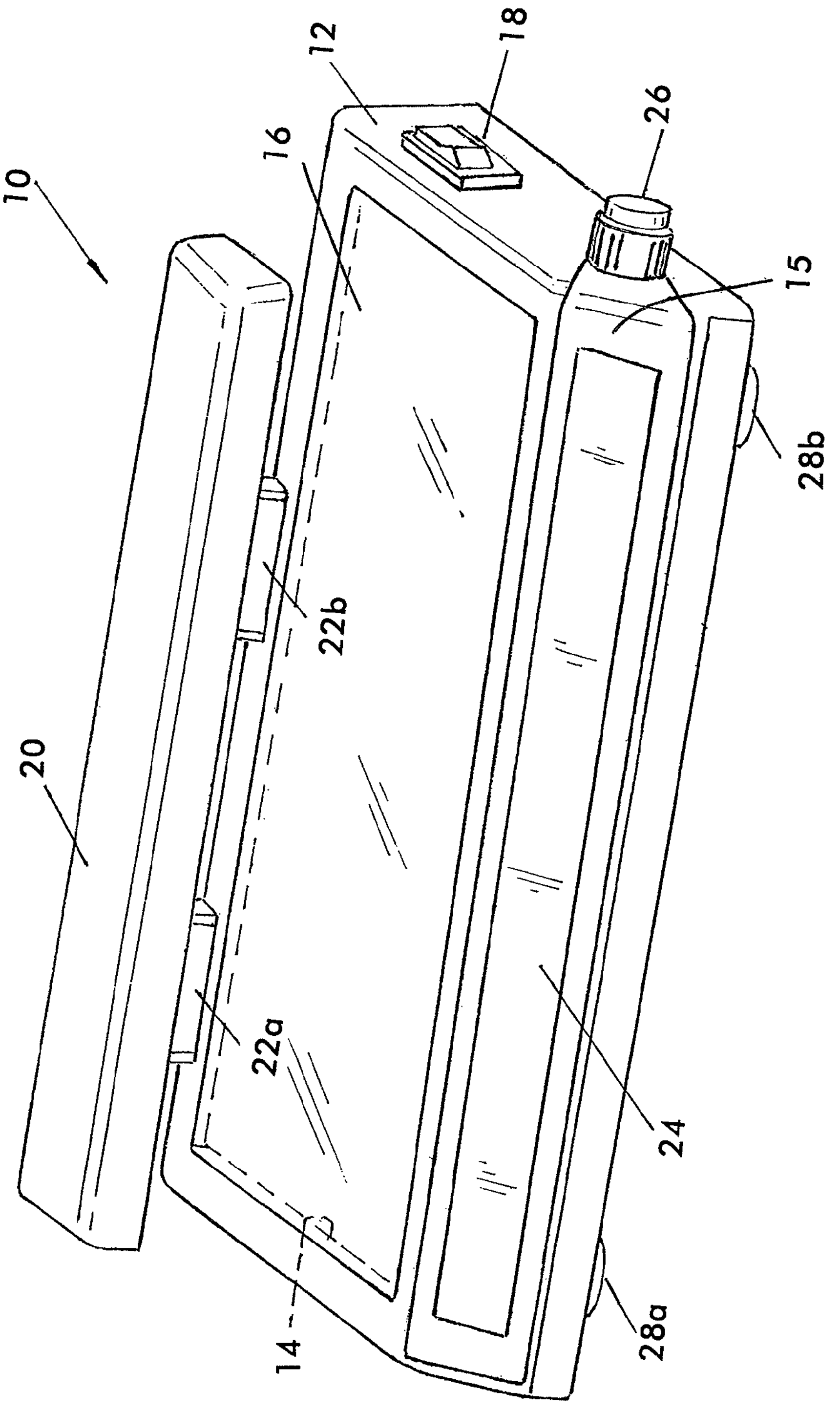
FIG. 1 is a perspective view showing the desktop counterfeit detector with its overhead UV lamp and counterfeit pen stored internally therein.

Referring to FIG. 1, the triple-test, desktop counterfeit currency detector 10 of the present invention comprises a generally rectangular base 12 that defines an interior space 14, which is covered by a backlit translucent panel 16 measuring approximately 160 millimeters in length and 70 millimeters in width, which is roughly equivalent to the dimensions of a standard U.S. currency bill. The base 12 rests on four suction cups, including front suction cups 28*a* and 28*b*. Inside the interior 14 are mounted upward facing, white LED's, which can be turned on by actuating switch 18 to backlight a test currency bill, which is placed on the light diffusing translucent panel 16 as shall be described below. The front sloping panel 15 supports a sticker 17 (FIG. 10) printed with currency strip locations, for the different currency denominations, to allow quick verification of the proper locations of the embedded strips. The illuminated bill 19 (FIG. 10) also allows discerning watermarks in the bill. Preferably, the footprint of the base 12 on a desktop is approximately 180 by 100 millimeters.

Figure 2:
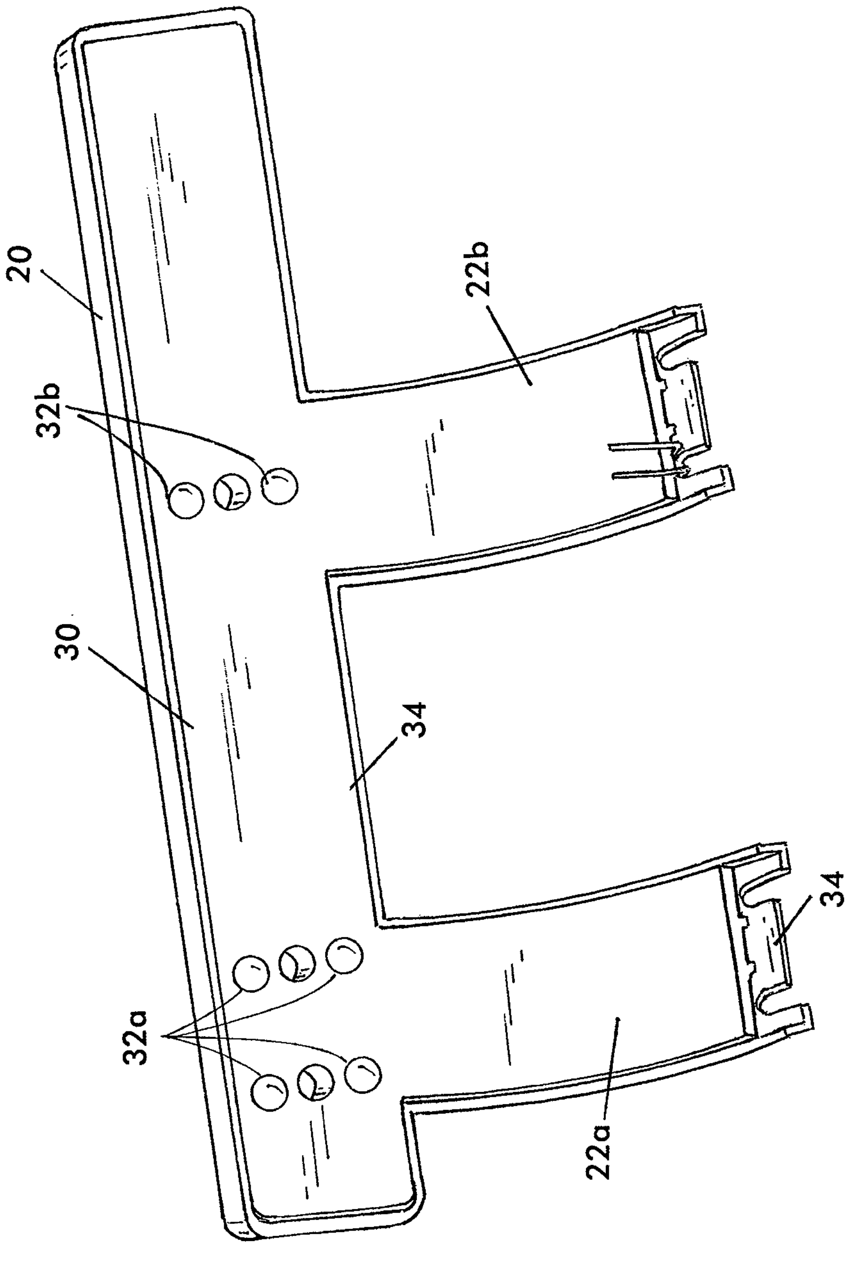
FIG. 2 shows the overhead lamp disattached from the desktop base of the UV detector FIG. 1.

A UV lamp sub-assembly 20 is detachably connected by means of curved legs 22*a* and 22*b* to the base 12 and comprises on the under wall 30 thereof (FIG. 2) a first bank of UV lamps 32*a* and a second UV lamp bank 32*b*. When turned on by switch 18, the UV lights, preferably LEDs, direct their light from above and onto the currency bill located on the translucent panel 16. This allows viewing of features which are more discernable with the UV light. Preferably, the switch 18 has a centered portion at which both the white and UV LEDs are turned off to conserve battery power.

Figure 1B:
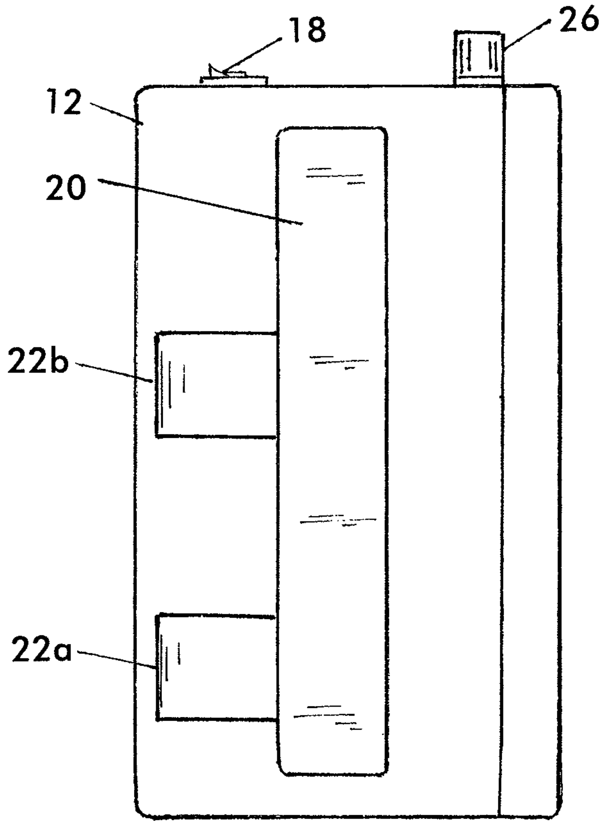
FIG. 1B is a top view of FIG. 1.
Figure 1A:
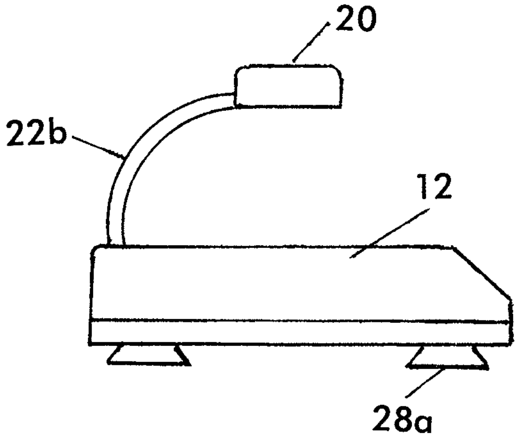
FIG. 1A is a side view of FIG. 1.
Figure 1C:
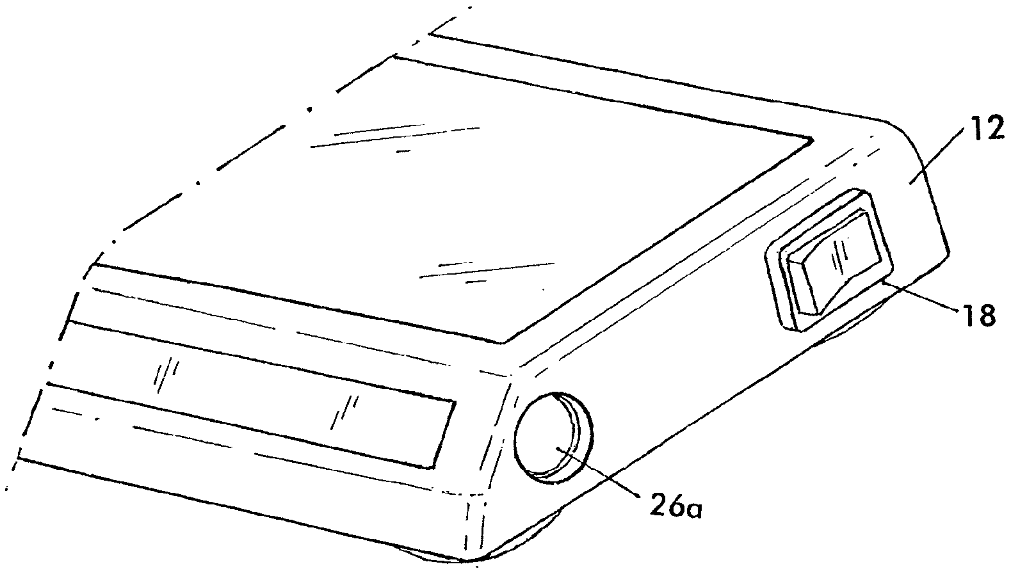
FIG. 1C is an enlargement of the right side of the counterfeit detector FIG. 1.
Figure 1D:
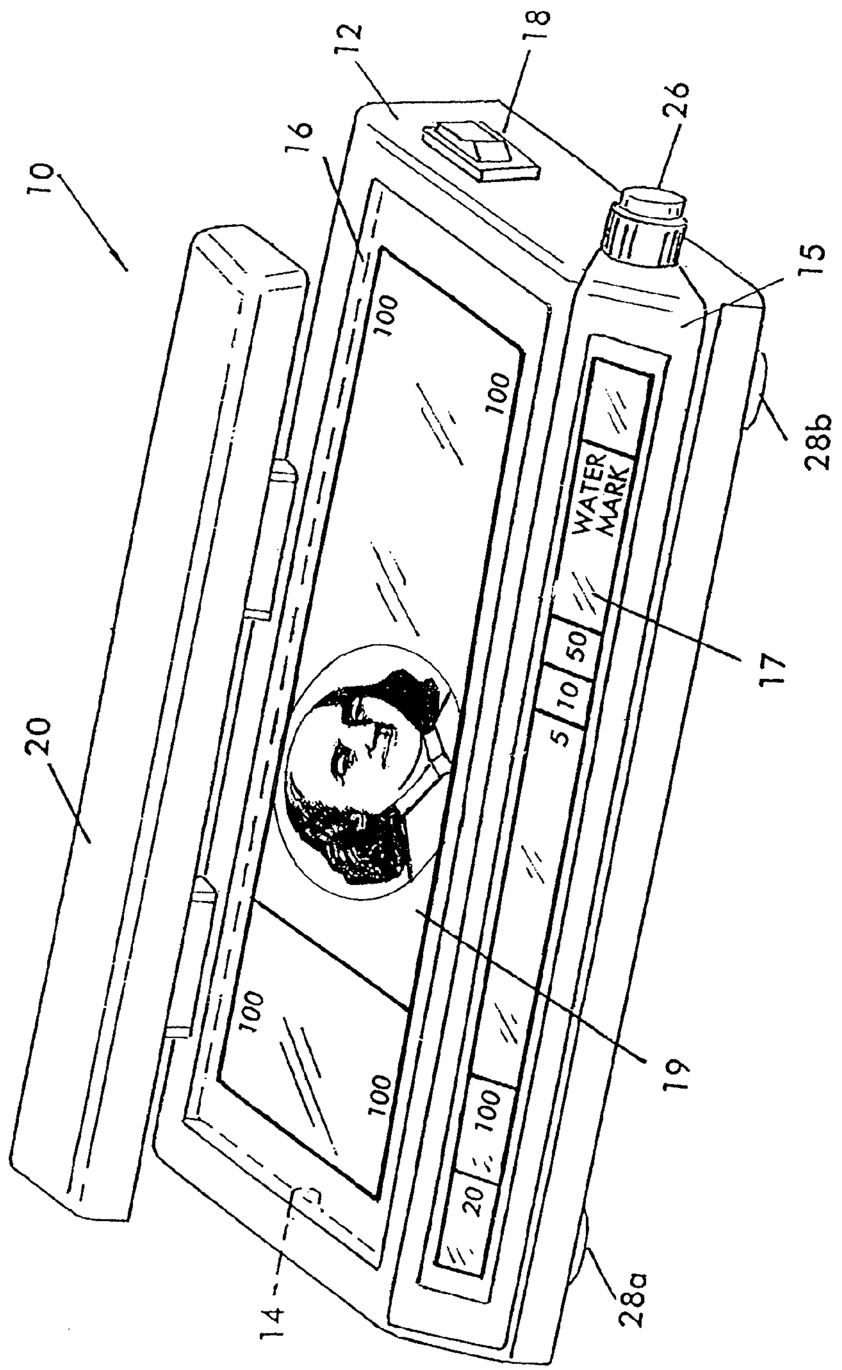
FIG. 1D shows the currency detector of FIG. 1 with the sticker printed with currency strip locations.

As a third means of bill testing, FIG. 1C shows a marker cavity 26*a* into which a conventional ink marker 26 is insertable and which can be retrieved to apply an ink formulation to a bill to test the paper thereof to assure that it is not a counterfeit bill as described in a prior U.S. patent including in U.S. Pat. No. 5,663,163, the contents of which are incorporated by reference herein.

Figure 2A:
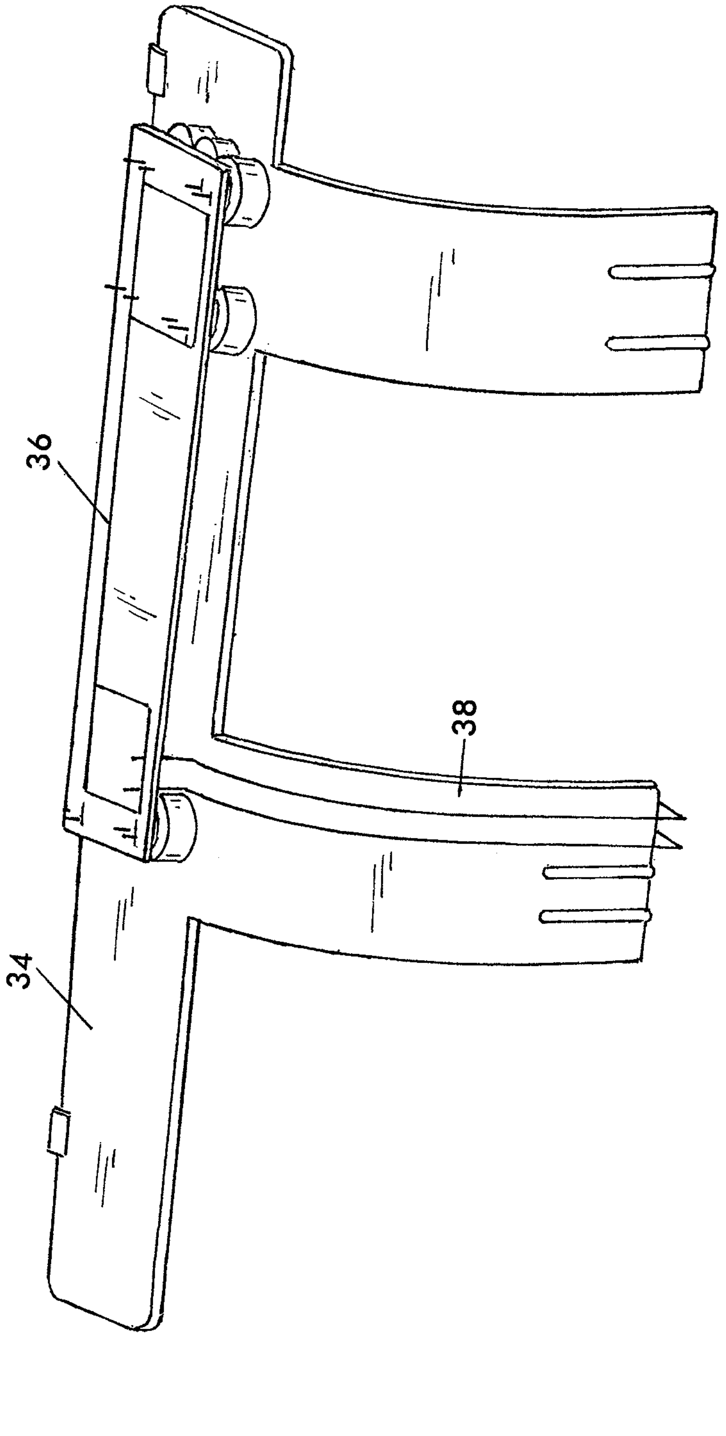
FIG. 2A is a perspective view showing internal details of the overhead detachable UV lamp.
Figure 3:
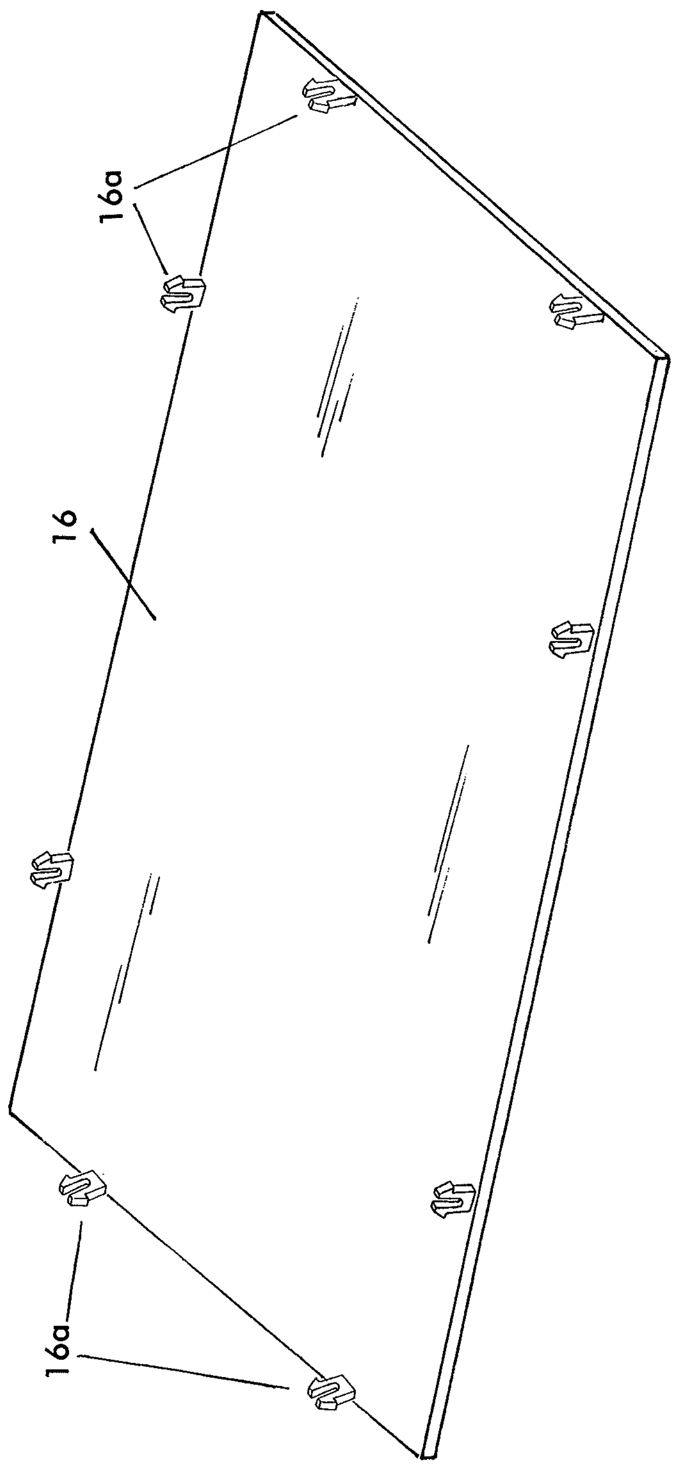
FIG. 3 shows a translucent light diffusing panel for the base of the currency detector of FIG. 1, on which a bill to be tested is placed.

Preferably, as shown in FIGS. 1A and 1B, the UV lamp assembly 20 is located approximately centrally over the translucent panel 16 on the base, about 32 millimeters above the currency being examined. The locations of the UV lamps and the carefully selected distance assure that a maximum UV light intensity is spread over the critical locations on the bill being tested, in an orientation and direction that positively protects against the UV light shining in the direction of a person's face or eyes. That is, as evident from FIGS. 1, 1A, 1B, 1D, 2 and 2A, the underwall 30 (FIG. 2) extends generally horizontally directly above the translucent panel 16, the UV LEDs are mounted on this underwall 30, they are not viable in use and their light cannot shine in the direction of a person's eyes, as noted above. Internally, the UV lamp assembly 20 comprises a UV printed circuit board 36 (FIG. 2A) which supports the aforementioned UV lamps and which conducts electrical power to the UV lights via positive and negative electrical leads 38, with the UV light being positioned over openings in the rear 34 of the panel 30 of the sub-assembly 20.

Figure 4:
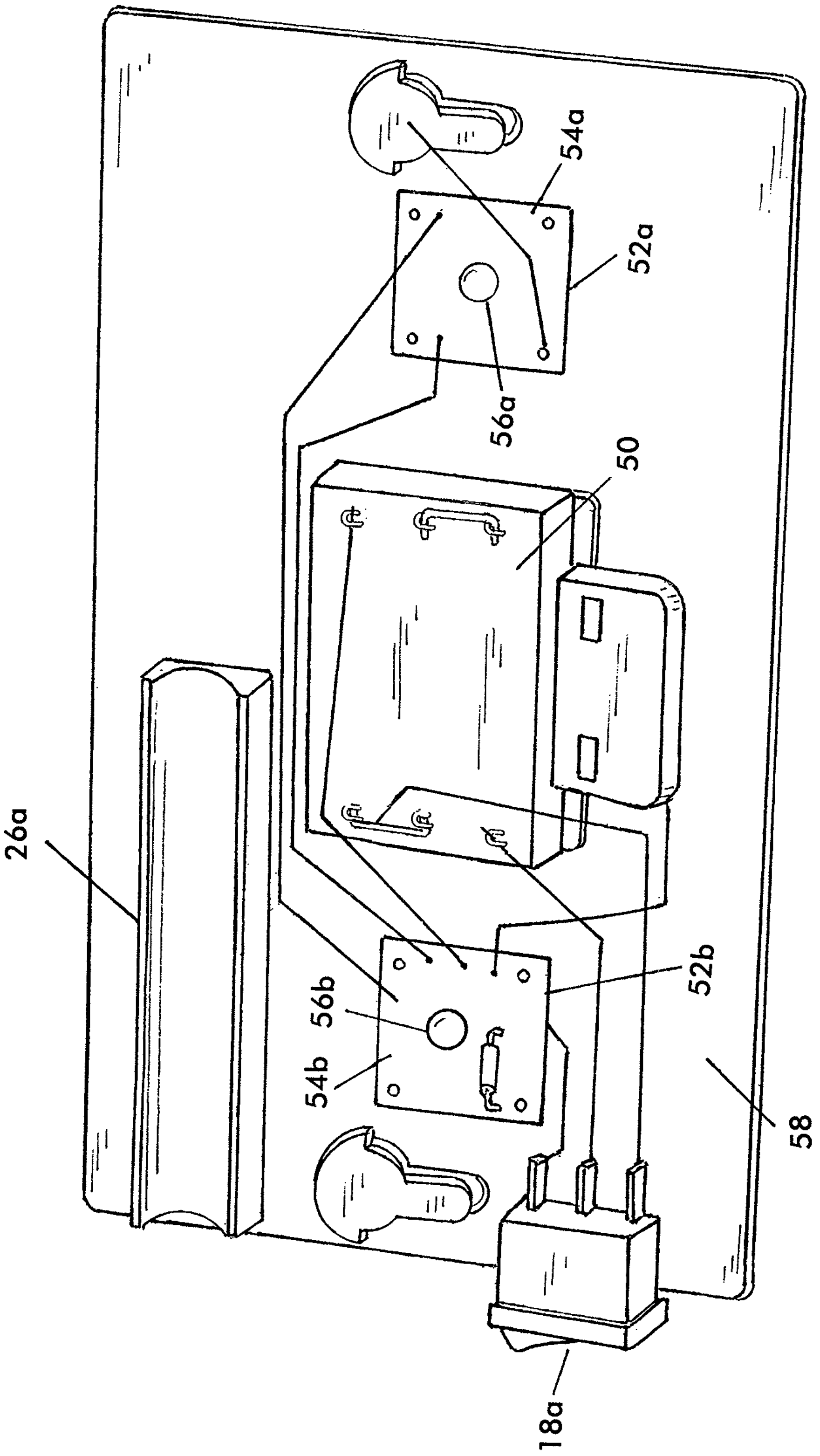
FIG. 4 shows internal details of the base of the currency detector FIG. 1.
Figure 4A:
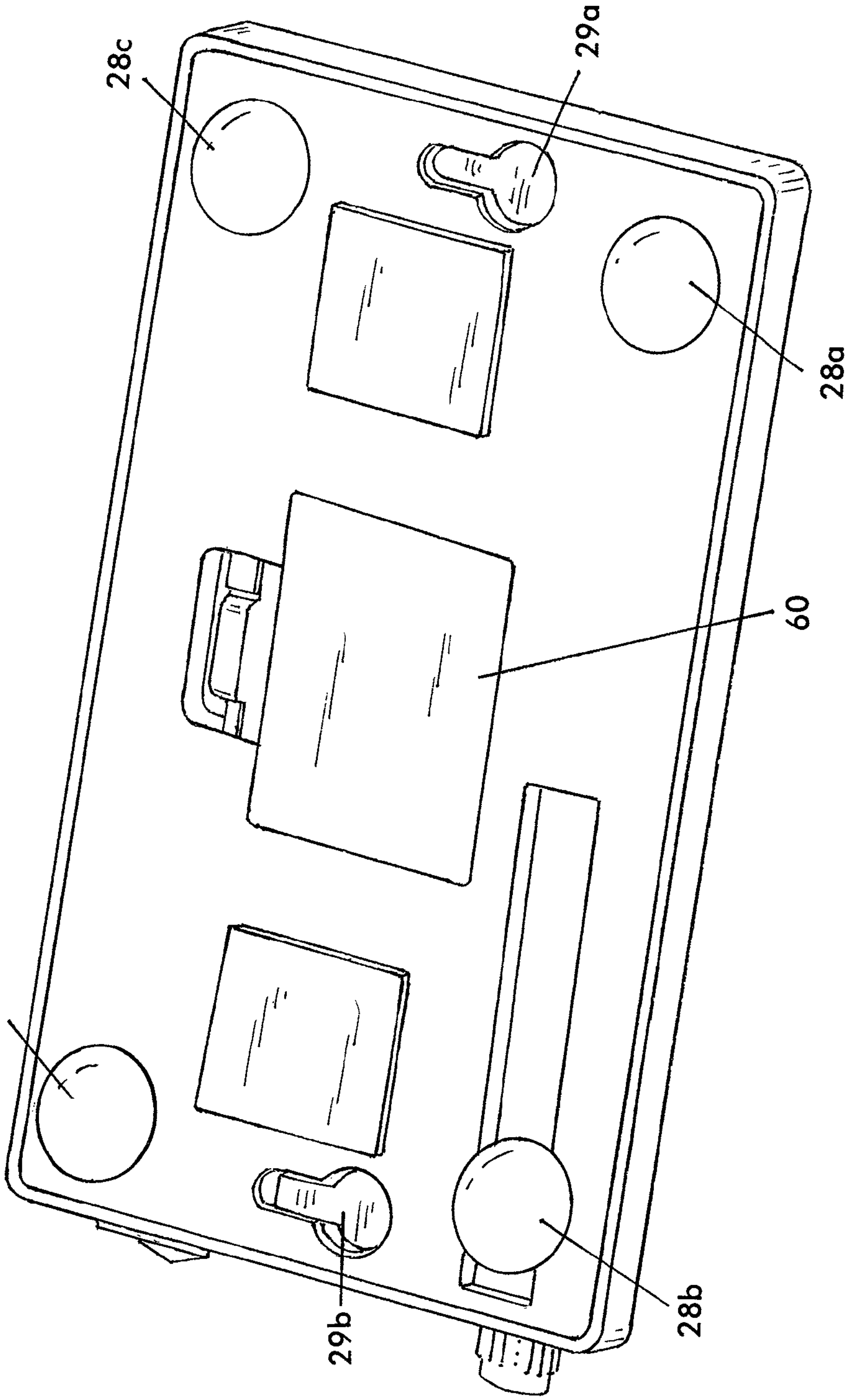
FIG. 4A is a bottom view of the base of the desktop counterfeit currency detector.

As shown in FIG. 4, at the bottom of the base 12 is a battery compartment 50 with cutouts 52*a*, 52*b* for two PC boards 54*a*, 54*b* for white LED's 56*a*, 56*b*. The switch body 18*a* directs power to either the white LED's or to the leads 58 extending to the UV lamp assembly 20, with the batteries (not shown) for powering the LED's being insertable through a removable cover 60 accessible through the bottom side, as shown in FIG. 4A. The base panel also defines half of the cylindrical cavity 26*a* for the marker 26, as seen in FIG. 4.

Referring to FIG. 4A, the four suction cups 28*a*, 28*b*, 28*c* and 28*d* assure that the desktop detector 10 is firmly attached to a desktop. However, the wall mount openings 29*a* and 29*b* also allow the tester to be mounted on a wall supported by screw heads so that desktop space need not be utilized.

One of the important considerations in the counterfeit detector of the present invention focuses on the selection of the parameter of the UV LEDs, their locations and their height over the currency being tested, in order to maximize the optical power output on the currency being tested while minimizing the number of UV LEDs being used and the battery power consumption.

In accordance therewith, the inventors herein have produced an embodiment (which they have reduced to practice), which utilizes UV LEDs made by Nichia Corporation as part number NSPU510CS. The particular UV LEDs have a peak wavelength at 375 nanometers with a range of 370 to 380 nm, with a spectrum half width of 15 nanometers. Typically the directivity, i.e., the radiation angle is in the range of 0-20 degrees, but can be up to 40 degrees.

The optical power output is typically in the range of 6800-9600 micro watts at a driving current of 15 milliamps but the invention contemplates that the optical power output can be in the range of 4800 to 13600 microwatts. By selecting four UV LEDs at the left side and two UV LEDs at the right side of the panel 30, the invention concentrates the UV optical power output advantageously unto the currency being tested, where most needed. Also, by selecting the height of the LEDs above the currency and by taking into account the directivity of the UV light which is typically in the range as described above, further advantages have been realized.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed:

1. A counterfeit detection apparatus, comprising:

a base, defining an interior therein and an open top, said open top being covered by a horizontally extending, translucent cover, said translucent cover having a shape and dimensions approximating a bill to be tested;

a source of white light inside the interior and directed at a bottom surface of the translucent cover;

a UV lamp assembly attached to and supported by the base by at least one leg and having a generally horizontally extending bottom facing surface juxtaposed to said cover, said lamp assembly supporting a plurality of UV LEDs located at said bottom facing surface and said UV LEDs projecting their UV light from above and directly onto the translucent cover on which the bill to be tested is positioned, wherein the UV lights are located such that the UV light which they project cannot reach the eyes of a human facing the counterfeit detection apparatus from above or from sideways directions.

2. The counterfeit detection apparatus of claim 1, wherein the dimensions of the translucent panel are about 160 mm in length and 70 mm in width.

3. The counterfeit detection apparatus of claim 1, wherein the base has footprint defined by its having a length of approximately 180 mm and a width of approximately 100 mm.

4. The counterfeit detection apparatus of claim 1, wherein the UV lamp assembly has width and length dimensions that are smaller than the corresponding width and length dimensions of the base and wherein the UV lamp assembly is located generally centrally over the translucent base.

5. The counterfeit detection apparatus of claim 1, including a plurality of white LEDs for providing said source of white light, said white LEDs projecting their light upward toward and through the translucent cover over which the bill to be tested has been placed.

6. The counterfeit detection apparatus of claim 1, wherein the UV lamp assembly comprises a first plurality of UV LEDs and a second plurality of UV LEDs spaced from one another along a length dimension of the UV lamp assembly.

7. The counterfeit detection apparatus of claim 6, wherein its UV has an optical power output in the range of 4800 to 13,600 μWatts.

8. The counterfeit detection apparatus of claim 7, wherein the optical power output is in the range of 6800 to 13,600 μWatts.

9. The counterfeit detection apparatus of claim 6, wherein the first plurality of LEDs include four UV LEDs and the second plurality include two UV LEDs.

10. The counterfeit detection apparatus of claim 1, wherein the UV lamp assembly is supported at a height of approximately 30 mm above the translucent cover of the base.

11. The counterfeit detection apparatus of claim 1, further comprising a switch configured to choose between white light and UV light testing of the bill to be tested.

12. The counterfeit detection apparatus of claim 1, further comprising a plurality of suction cups mounted to an underside of the base to allow the base to adhere to a flat surface by suction.

13. The counterfeit detection apparatus of claim 1, further comprising a battery compartment and at least one battery, and wherein said apparatus is configured to be powered exclusively by said at least one battery.

14. The counterfeit detection apparatus of claim 1, further comprising cutouts formed on an underside of the base, configured to enable mounting said apparatus on a vertical wall on a pair of spaced screwheads.

15. The counterfeit detection apparatus of claim 1, further comprising a currency identifying strip mounted to a front surface of the base and said strip including designations identifying the locations of embedded strips and currency denomination indications associated therewith.

16. The counterfeit detection apparatus of claim 1, wherein the UV lamp assembly is detachably mounted to the base and held thereto by at least one curved leg which, in turn, supports a light assembly containing said plurality of UV LEDs.

17. The counterfeit detection apparatus of claim 1, wherein said translucent is configured to diffuse light passing through said cover.

18. The counterfeit detection apparatus of claim 1, wherein said UV lamp assembly comprises a rectangular body which is supported by said at least one leg and wherein said body is substantially entirely located approximately centrally above said base.

19. A counterfeit detection apparatus, comprising:

a base, defining an interior therein and an open top, said open top being covered by a translucent cover, said translucent cover having a shape and dimensions approximating a bill to be tested;

a source of white light inside the interior and directed at a bottom surface of the translucent cover;

a UV lamp assembly attached to and supported by the base and having a bottom facing surface juxtaposed to said cover, said lamp assembly supporting a plurality of UV LEDs which project their UV light from above and directly onto the translucent cover on which the bill to be tested is positioned, further comprising a tubular compartment defined inside the base and an opening for the insertion therethrough and therein of a counterfeit detector pen which includes an ink formulation able to test paper stock for iodine.

* * * * *